April 8, 1941.  O. L. SMITH  2,237,849

FERTILIZER DISTRIBUTOR AND THE LIKE

Filed Oct. 4, 1938  2 Sheets-Sheet 1

Oscar L. Smith, INVENTOR

BY Victor J. Evans & Co.

ATTORNEYS

April 8, 1941.   O. L. SMITH   2,237,849
FERTILIZER DISTRIBUTOR AND THE LIKE
Filed Oct. 4, 1938   2 Sheets-Sheet 2
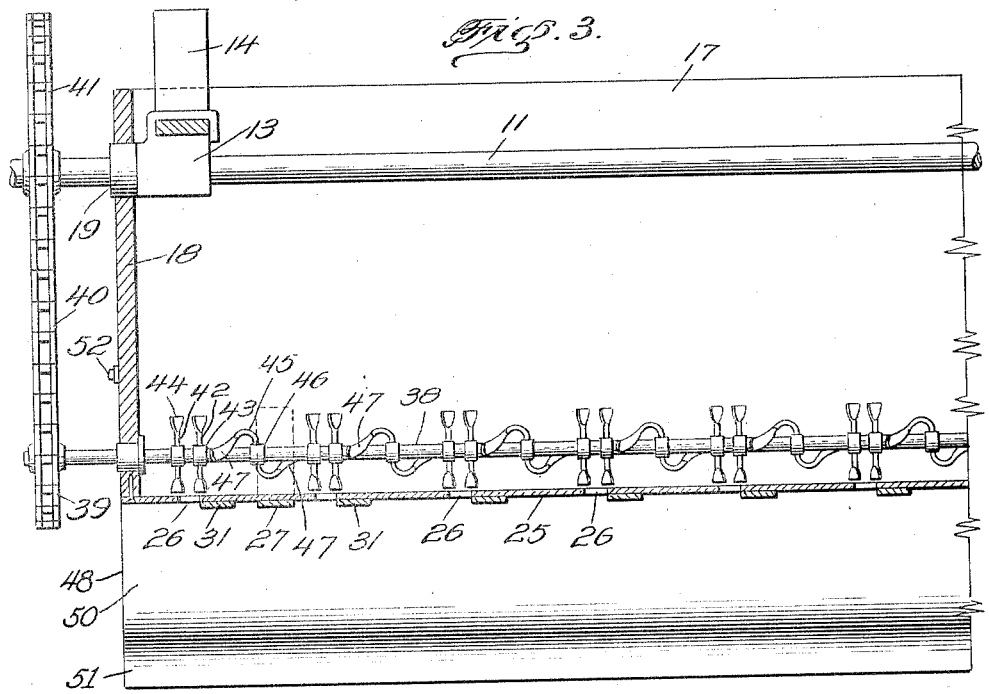
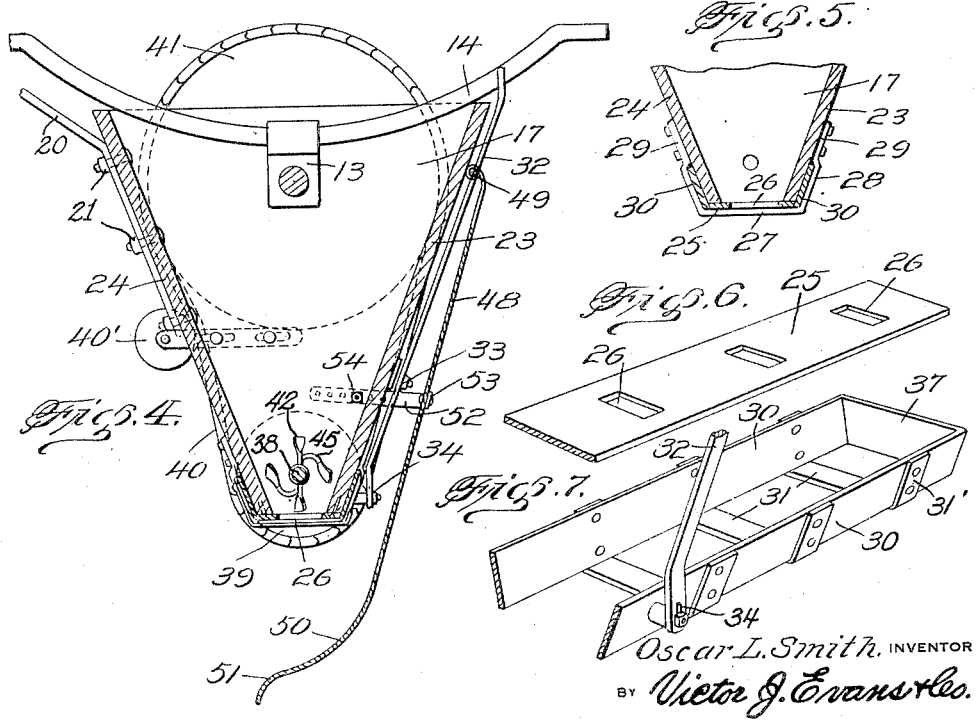
Oscar L. Smith, INVENTOR
BY Victor J. Evans & Co.
ATTORNEYS Patented Apr. 8, 1941

2,237,849

UNITED STATES PATENT OFFICE 2,237,849

FERTILIZER DISTRIBUTOR AND THE LIKE

Oscar Lee Smith, Atmore, Ala.

Application October 4, 1938, Serial No. 233,305

3 Claims. (Cl. 221—120)

This invention relates to fertilizer distributors and the like, and has for its principal object to produce a simple yet practical and efficient farm machine for effectively distributing and spreading fertilizer, lime and other soil treating materials.

An important object is to provide for a simple and ready adjustment of the discharge outlets of the material containing hopper and also in the provision of effective agitating means for the material in association with the discharge outlets.

A further object is to provide an effective shield against wind interference in the distribution of the material.

With the foregoing and other objects and advantages to be attained, as will hereinafter more fully appear, the invention consists in the general machine assembly and in the particular parts and combinations and arrangements of parts thereof as hereinafter described and set forth in the appended claims, reference being had to the accompanying drawings illustrating a practical adaptation of the invention, in which—

Figure 1 is a rear elevation of the machine;

Figure 2 is a top plan view;

Figure 3 is a fragmentary view, on an enlarged scale, partly in vertical section and rear elevation, showing details of the material distributing and agitating means;

Figure 4 is a transverse vertical section through the hopper and associated parts;

Figure 5 is a fragmentary section through the lower portion of the hopper illustrating structural details of the distributor elements;

Figure 6 is a fragmentary perspective view of the apertured bottom plate of the hopper; and Figure 7 is a similar view showing details of the reciprocatory gate frame.

Referring now to the drawings, the numeral 10 designates the ground wheels of the machine which may be obviously fixed on the axle 11 to rotate therewith in either direction, or, in some cases, said wheels may be applied to the axle 11 with interposed ratchet means so that the axle is only rotatable forwardly with the wheels and may not turn when the wheels are reversely rotated.

Supported on the axle 11 by bearing members 13, is a carriage frame 14 on which a platform 15 is mounted, said carriage frame also having a pair of draft members 16, as shown, or being obviously otherwise provided for drawing the machine in use.

Suspended beneath the platform 15 is a transverse elongated hopper 17 whose end walls 18 are supported on bearing elements 19 provided on the shaft 11 adjacent the outer sides of the platform bearing members 13 whereby the shaft is free to rotate, the hopper being held against swinging movement on the bearing elements 19 by bracket members 20 which are bolted at their lower ends to the rear wall of the hopper 17, as at 21, and extend upwardly and rearwardly from the hopper and are fastened to the carriage frame 14, as at 22.

The hopper, as shown, comprises the opposite end walls 18 which are substantially wedge shape or of a truncated triangular form, said end walls being connected by the downwardly convergent front and rear walls 23 and 24, respectively. The hopper has an elongated bottom plate 25 which is provided with a series of transversely elongated openings 26 therein, said openings being of a predetermined definite size and spaced a distance apart from each other corresponding to a standard width between furrows or lines of planting for which a field has been prepared. For example, in most practical adaptations of the invention, these openings will be located at six inches between centers and the respective openings will be approximately one inch in width by two and one-fourth inches in length, and the machine will be operated with the variable range of said openings from full width down to approximately one-eighth of an inch, which variation is accomplished by an adjustable valve arrangement to be now described.

Secured on the lower portion of the hopper 17, are transverse strap members 27 which extend across the underside of the bottom plate 25 in close supporting relation thereto, as shown more clearly in Figure 5, and thence upwardly over the adjacent outer faces of the front and rear side walls 23 and 24 at a corresponding angle and in spaced relation thereto, as at 28, the extreme end portions of said strap members being off-set inwardly, as at 29, and fastened to the adjacent face portions of said side walls 23 and 24, respectively. Slidable longitudinally through the space between the strap portions 28 and adjacent portions of the side walls 23 and 24 is a gate frame comprising elongated flat side members 30, said side members 30, of course, being set at an inclination corresponding to that of the opposite hopper side walls 23 and 24. At intervals throughout the length of said side members 30 of the gate frame, corresponding to the distance between the respective openings 26 of the bottom plate 25 of the hopper, said members 30 are cross-connected by flat bars 31, each of a width not less but preferably slightly greater than the width of an opening 26 so as to completely close said openings 26 in the plate 25 when the gate frame is moved to position said cross members 31 thereof fully thereunder. Said cross members 31 may be attached to the longitudinal frame members 30 in any approved manner, but, as shown, the ends of said cross members are extended and turned upwardly upon the outer faces of said side members 30 and riveted thereto, as at 31'.

The gate frame 30 is shifted endwise by a hand lever 32 which is pivotally mounted, as at 33, on the front wall 23 of the hopper, the lower end portion of said lever 32 having an obvious slot and stud attachment 34 with the adjacent gate frame member 30. Obviously, by rocking the hand lever 32 the gate frame may be moved lengthwise a distance corresponding to the degree to which it is desired to open the slots 26 of the bottom plate 25 of the hopper, and, to hold the lever in its adjusted position, a latching provision may be made including a toothed sector 35 mounted on the platform 15 adjacent a conventional slot in the platform through which the hand lever works, and the hand lever having a latch member 36 releasably engageable with said sector 35. In this connection, it is also preferable to connect the longitudinal gate frame members 30 at one end by a cross member 37, as shown in Figure 7, said cross member in addition to adding to the rigidity of the frame structure providing a stop for engaging the adjacent end wall of the hopper to limit the endwise movement of the frame in closing the discharge openings 26 and being obviously positioned normally an ample distance away from the adjacent end of the hopper to permit such movement, the opposite ends of the frame members 30 being disconnected and permitting endwise movement of the gate frame in the opposite direction without limit except that which is caused by the engagement of the latch member 36 of the hand lever 32 with the toothed sector 35.

Working adjacent the bottom plate 25 of the hopper is an agitator comprising a shaft 38 which is journaled in the opposite end walls 18 of the hopper, one end of the shaft extending outwardly beyond the adjacent end wall and provided with a sprocket wheel 39 which is connected by a chain 40 to the driving sprocket 41 on the axle 11. Any suitable slack adjuster may be provided for the driving chain 40, a device of this character being conventionally shown in the drawings as including an idler 40' journaled on an adjustable bracket on the end wall of the hopper. Fixed on the shaft 38 in working relation directly above the respective discharge openings 26 of the bottom plate 25 are cooperative pairs of diametrically opposed fingers 42, said fingers having stem portions of relatively small diameter adjacent their hub portions 43 but the outer end portions of the fingers being flattened into blade like form, as at 44, while between the respective pairs of straight radially and diametrically opposed fingers or blades, the shaft 38 is provided with a series of oppositely curved elements 45 extending spirally from a central hub portion 46, the outer ends of said elements 45 being formed in a substantially spoon shape, as at 47, and set reversely to each other so that the material in the region of the bottom plate 25 of the hopper is separated and moved in opposite directions toward the respective outlet openings 26. By this provision a thorough agitation of the material is effected and there is an equalized distribution thereof through the openings 26 in that the curved elements 45 keep the material moving evenly in opposite directions between said openings 26 while the straight radial elements 42 drive the material directly through said openings so as to effectively prevent clogging in the region thereof.

Preferably, a wind shield comprising a sheet metal apron 48 is hingedly supported at its upper end on the front wall 23 of the hopper, as at 49, said apron extending downwardly in spaced relation to said front wall 23 and terminating some distance below the bottom of the hopper, the lower end portion of the apron being curved rearwardly, as at 50, and thence downwardly, as at 51. By having the rearwardly curved portions 50 and 51 of the apron disposed beneath the bottom of the hopper the apron not only serves as a shield to effectively prevent wind interference with the delivery of the discharged fertilizer or other material from the hopper but it serves to further advantage in that a substantial spreading of the material is caused by the impact of the material upon said rearwardly curved portions which deflect the spread material rearwardly therefrom. In this connection, it is noted that adjustment of the apron relative to the front wall of the hopper and as to its effective range beneath the hopper is provided by means of link members 52 which are pivotally attached at the opposite side marginal portions of the apron, as at 53, and have an adjustable attachment to the adjacent end wall portions 18 of the hopper, as by providing said link members 52 with a longitudinal series of apertures for engagement with a securing bolt 54 as shown in Figure 4.

In addition to the provision for distributing the material from the hopper 17, there is an advantage in the provision of the platform 15 in the body construction of the machine in that an additional supply of the fertilizer or other material may be carried on said platform in sacks or other containers.

Obviously, the structure admits of considerable modification within the spirit and scope of the invention as defined by the appended claims. The invention, therefore, is not limited to the specific construction and arrangements shown in the accompanying drawings.

What is claimed is:

1. In a distributor for fertilizer and the like, of the wheeled frame type and including an elongated transverse hopper depending beneath the frame and provided with a longitudinal series of material distributing openings in the bottom thereof and an agitator including a power-driven shaft extending longitudinally of the hopper above the series of material distributing openings, the agitator further comprising cooperative diametrically opposed radial fingers mounted on the shaft thereof to rotate therewith, said fingers being respectively located in cooperative working relation directly above the material distributing openings, and deflector elements fixed on said shaft to rotate therewith between the respective fingers, said deflector elements each including a hub portion and oppositely disposed arms extending spirally endwise from said hub portion in reversed arrangement and being substantially spoon-shaped at their free outer ends and said end portions being set with reverse angularity whereby said deflector elements separate the material between the fingers and deflect the material in opposite directions to the material distributing openings.

2. In a distributor for fertilizer and the like, of the wheeled frame type and including an elongated transverse hopper depending beneath the frame and provided with a longitudinal series of material distributing openings in the bottom thereof and an agitator including a power-driven shaft extending longitudinally of the hopper above the series of material distributing openings, the agitator further comprising cooperative pairs of diametrically opposed radial fingers mounted on the shaft thereof to rotate therewith, said pairs of fingers being respectively located in cooperative working relation directly above the material distributing openings, and deflector elements fixed on said shaft to rotate therewith between the respective pairs of fingers, said deflector elements each including a hub portion and a complemental pair of oppositely disposed arms extending spirally endwise from said hub portion in reversed arrangement and being substantially spoon-shaped at their free outer ends and said end portions being set with reverse angularity whereby said deflector elements separate the material between the pairs of fingers and deflect the material in opposite directions to the material distributing openings.

3. In a distributor for fertilizer and the like, of the wheeled frame type and including an elongated transverse hopper depending beneath the frame and provided with a longitudinal series of material distributing openings in the bottom thereof and an agitator including a power-driven shaft extending longitudinally of the hopper above the series of material distributing openings, the agitator further comprising cooperative diametrically opposed radial fingers mounted on the shaft thereof to rotate therewith, said fingers being respectively located in cooperative working relation directly above the material distributing openings and each finger having a stem portion of small diameter radiating from the shaft and the outer end portion thereof being flattened and blade-like, and deflector elements fixed on said shaft to rotate therewith between the respective fingers, said deflector elements each including a hub portion located on the shaft midway between the fingers and oppositely disposed arms extending spirally endwise from said hub portion in reversed arrangement and being substantially spoon-shaped at their free outer ends which terminate contiguous to said fingers and said end portions so shaped being set with reverse angularity whereby said deflector elements separate the material between the fingers and deflect the material in opposite directions to the material distributing openings.

OSCAR LEE SMITH.